C. SKIDD.
HOLDING APPARATUS.
APPLICATION FILED MAR. 11, 1916.
1,204,078.
Patented Nov. 7, 1916.
5 SHEETS—SHEET 1.
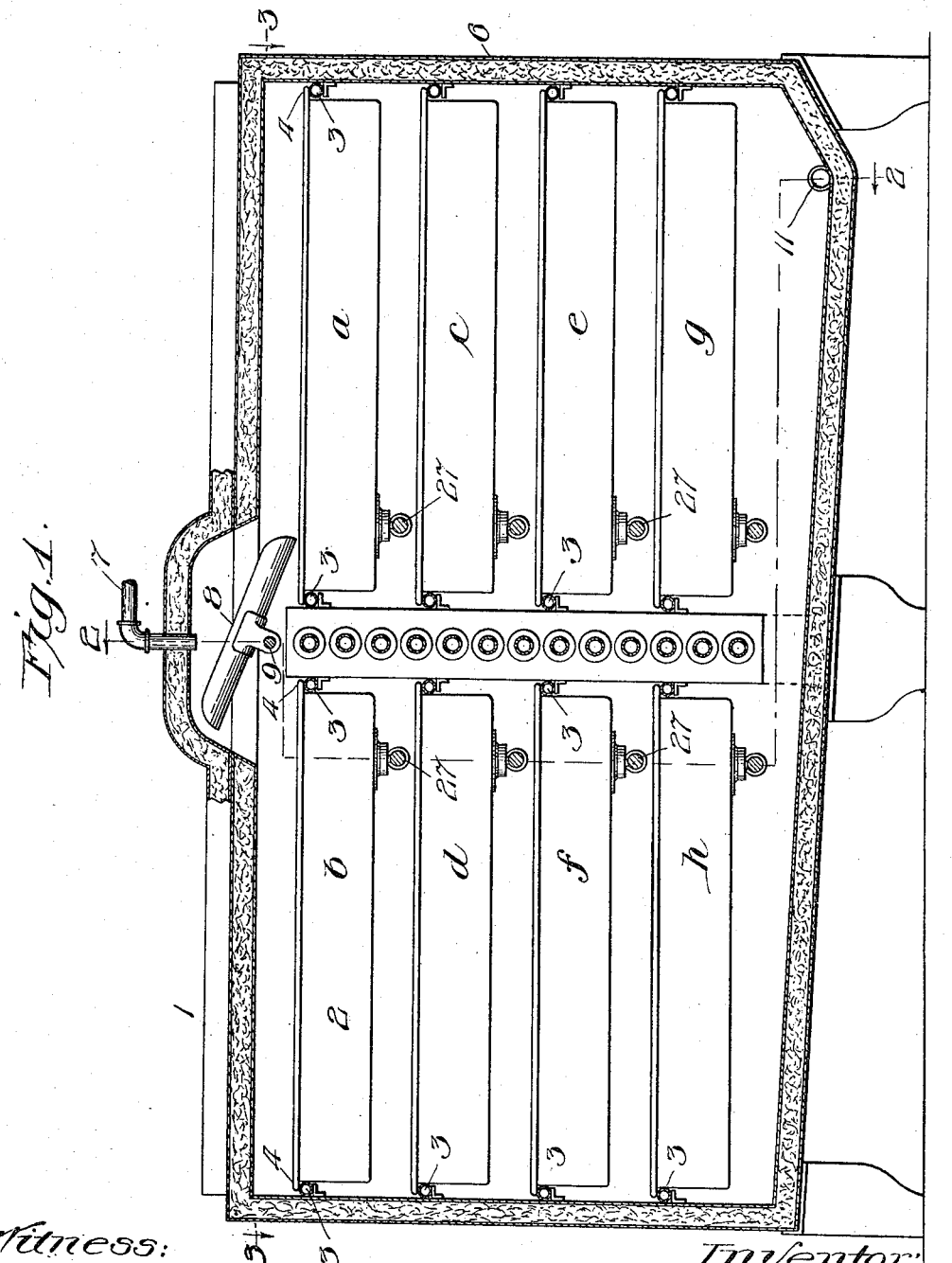
Witness:
H. S. Gaither
Inventor:
Charles Skidd
Miller Chindahl Parker
Attys.

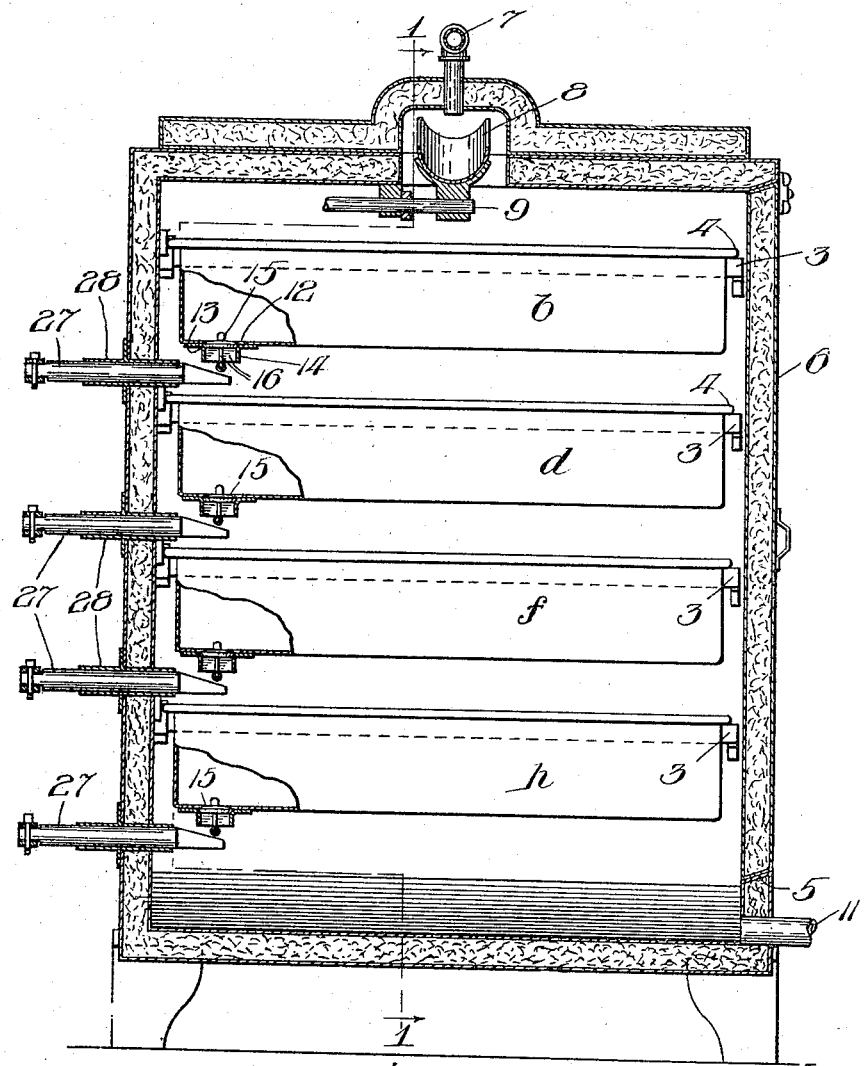

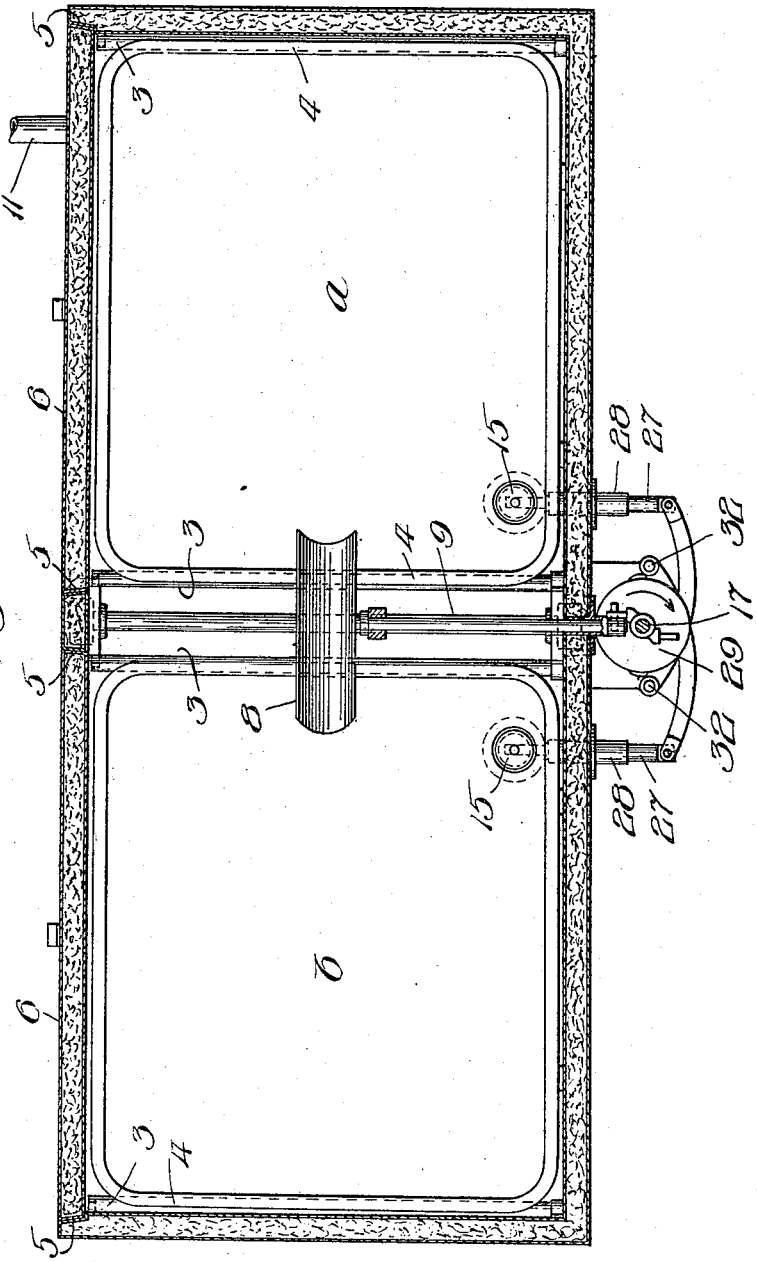

C. SKIDD.
HOLDING APPARATUS.
APPLICATION FILED MAR. 11, 1916.
1,204,078.
Patented Nov. 7, 1916.
5 SHEETS—SHEET 4.
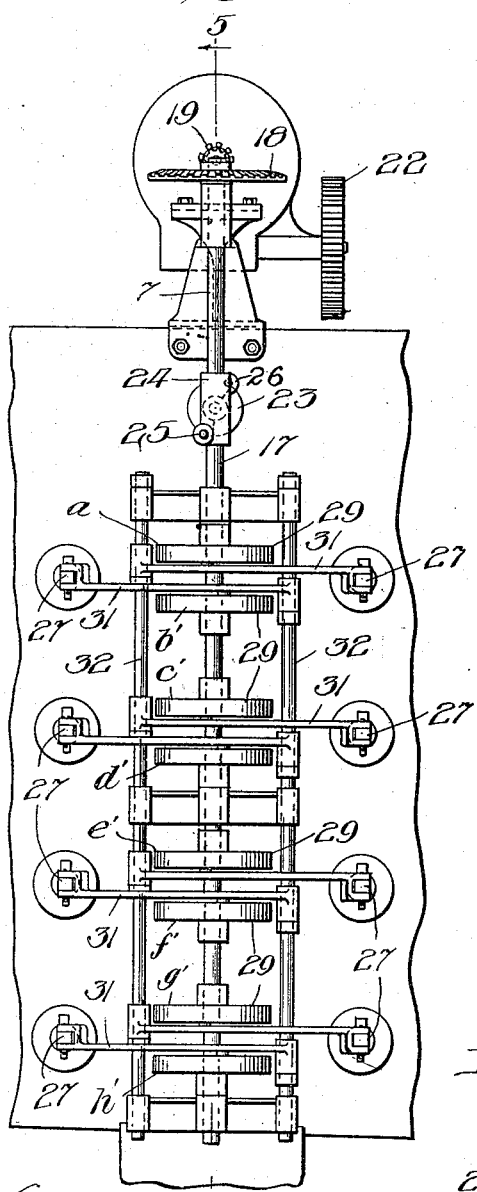
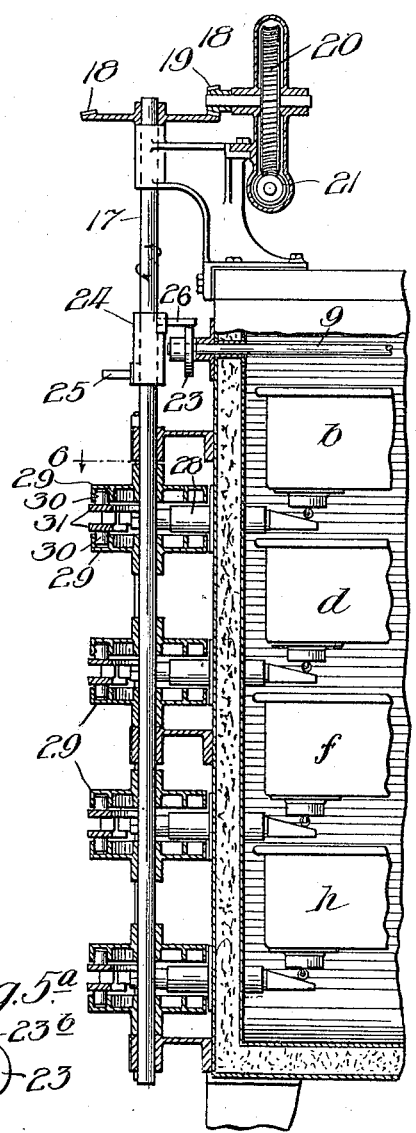

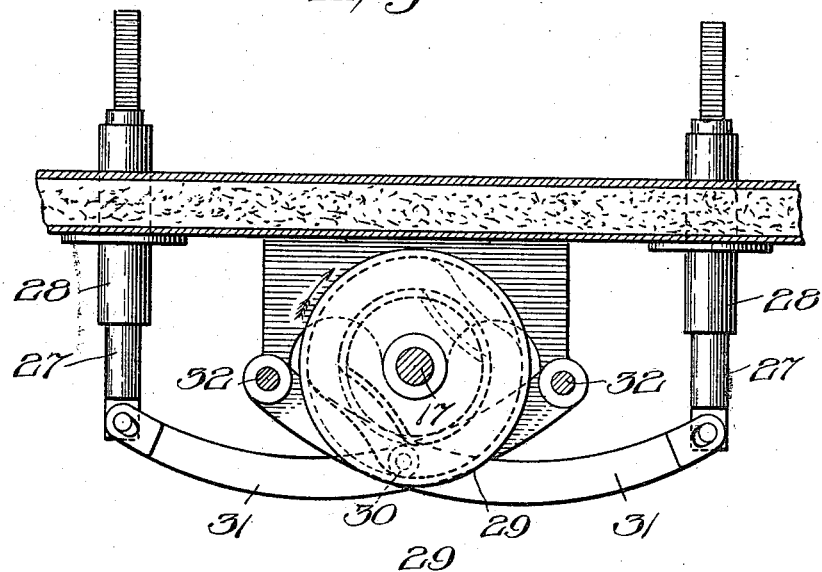
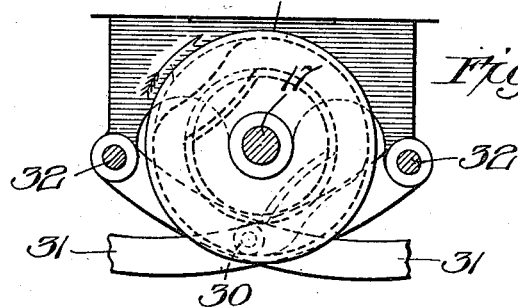
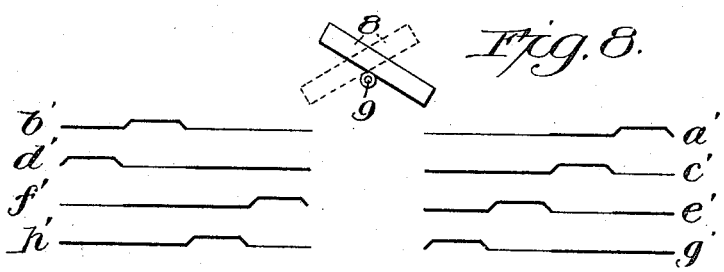

UNITED STATES PATENT OFFICE.

CHARLES SKIDD, OF KENOSHA, WISCONSIN.

HOLDING APPARATUS.

1,204,078.  Specification of Letters Patent.  Patented Nov. 7, 1916.

Application filed March 11, 1916. Serial No. 83,481.

*To all whom it may concern:*

Be it known that I, CHARLES SKIDD, a citizen of the United States, residing at Kenosha, in the county of Kenosha and State of Wisconsin, have invented certain new and useful Improvements in Holding Apparatus, of which the following is a specification.

Effective pasteurization of milk and cream necessitates the holding of the heated liquid at a certain temperature for a definite length of time, usually twenty or thirty minutes, such holding being necessary to insure the destruction of pathogenic bacteria.

This invention relates to means to receive milk or cream as it is discharged from a heater; to hold the liquid for a certain length of time; and to continuously discharge the liquid into a cooler.

The object of the invention is to produce an apparatus of this character which shall be effective in action, of simple construction, and capable of being conveniently and thoroughly cleaned.

In the accompanying drawings, Figure 1 is a vertical sectional view of an apparatus embodying the features of my invention, the view being taken approximately in the plane of dotted line 1—1 of Fig. 2. Fig. 2 is a vertical sectional view taken approximately in the plane of dotted line 2—2 of Fig. 1. Fig. 2$^a$ is a detail view of a valve. Fig. 3 is a horizontal sectional view taken approximately in the plane of dotted line 3—3 of Fig. 1. Fig. 4 is an elevation of the operating mechanism. Fig. 5 is a sectional view taken in the plane of dotted line 5—5 of Fig. 4. Fig. 5$^a$ is a detail view of a cam or trip collar. Fig. 6 is a horizontal sectional view taken in the plane of dotted line 6 of Fig. 5. Fig. 7 is a view similar to that of Fig. 6, but showing the parts in a different position. Fig. 8 is a diagrammatic view illustrating the sequence of operations.

The apparatus includes a casing 1 which may be rectangular as herein shown, or of any other suitable form. The walls constituting the casing may be of any suitable material and are preferably insulated to prevent radiation of heat from the milk. The interior of the casing may be lined with suitable material that can be thoroughly cleaned.

Within the casing 1 are pans or relatively shallow receptacles 2 in which the milk is held, the pans being arranged in one or more tiers, two tiers being herein shown. For convenience in describing the operation of filling and emptying the pans, the respective pans are indicated by the reference letters $a$, $b$, $c$, $d$, $e$, $f$, $g$ and $h$. The pans are removably supported in a suitable manner, as by means of ledges 3 upon which the flanges 4 of the pans rest. The ledges 3 are rigidly supported within the casing 1 in any suitable manner.

In the front wall of the casing 1 opposite each tier of pans 2 is an opening 5 (Fig. 3) of sufficient size to permit the convenient withdrawal of the pans when the latter and the interior walls of the casing are to be cleaned. These openings are normally closed by means of doors 6 which are held in place by any suitable means (not shown).

The milk received from the milk-heater enters through a pipe 7 which discharges at a point located centrally of the upper wall of the casing 1. Directly below the discharge end of the pipe 7 is a distributer 8 consisting, in the present embodiment, of an open-end trough secured midway of its ends to a rock-shaft 9 extending midway between and above the pans $a$ and $b$. It will be seen that the distributer 8 is arranged to direct milk to the pans $a$ and $b$ alternately. From the pan $a$ the milk flows first to the pan $c$ and then to the pan $e$ and then to the pan $g$. From the pan $b$ the milk flows to the pans $d$, $f$ and $h$ in succession. From the pans $g$ and $h$ the milk is discharged upon the bottom wall of the casing 1, being thence drained through an outlet pipe 11 to the cooler (not shown).

Each of the pans $a$ to $g$, inclusive, is provided with an outlet opening 12 (Fig. 2.) said opening being surrounded by a tapered valve seat 13 and a tubular guide 14. The outlet opening 12 is normally closed by a self-seating or gravity valve 15 having radial guides 16 which are vertically slidable in the tubular guide 14. For convenience of operation, the valves of the pans a to g, inclusive, are grouped in two vertical series located near the middle of the rear wall of the casing 1.

The mechanism for operating the distributer 8 and the valves 15 in proper order comprises a vertical shaft 17 supported in suitable bearings upon the rear wall of the casing 1. The shaft 17 is continuously but slowly rotated by any suitable means, as, for example, the gear train shown in Figs. 4 and 5 and comprising the gears 18, 19, 20, 21 and 22. The connection between the shafts 9 and 17 may be of any preferred character, that herein shown comprising a collar 23 (Figs. 5 and 5ª) fixed upon the shaft 9, and a sleeve or hub 24 fixed upon the shaft 17 and carrying two pins 25 and 26 arranged alternately to engage the trip collar 23 to rock the shaft 9. The pin 25 operates against the surface 23ª and the pin 26 operates against the surface 23ᵇ of the collar 23.

The valves 15 are arranged to be raised by means of plungers 27 slidably mounted in tubular guides 28 extending through the rear wall of the casing 1, the inner ends of the plungers 27 being inclined to operate against rounded surfaces upon the lower ends of the guides for the valves 15. The plungers 27 are reciprocated in proper sequence by means of cams 29 fixed upon the shaft 17, each cam having a cam groove to receive a roller stud 30 carried by a lever 31. The levers 31 are pivoted at one end upon rods 32 for independent pivotal movement. The opposite ends of the levers 31 are pivoted to the outer ends of the plungers 27, the pivotal connection between the levers and the plungers being sufficiently loose to permit of the short rectilinear movement required of the plungers.

All of the cams 29 are of the same form, the form of the grooves being such that the valves 15 are closed during 270° of a revolution of the cam and are open during the remaining 90°. For convenience in describing the operation of the machine, each of the cams 29 will be designated by the letters $a'$, $b'$, $c'$, $d'$, $e'$, $f'$, $g'$, $h'$, respectively. The cam $a'$ controls the valve for the pan $a$; and so on throughout the series. The order in which the pans $a$ to $h$, inclusive, are filled and emptied is indicated in the diagram in Fig. 8 and is shown in the following table (all of the pans being assumed to be empty at the beginning of the first revolution of the shaft 17):

| | First revolution. | | | | Second revolution. | | | | Third revolution. | | | |
|---|---|---|---|---|---|---|---|---|---|---|---|---|
| | 1st ¼. | 2nd ¼. | 3rd ¼. | 4th ¼. | 5th ¼. | 6th ¼. | 7th ¼. | 8th ¼. | 9th ¼. | 10th ¼. | 11th ¼. | 12th ¼. |
| a | Fill | Fill | Hold | Empty | Fill | Fill | Hold | Empty | Fill | Fill | Hold | Empty. |
| b | | | Fill | Fill | Hold | Empty | Fill | Fill | Hold | Empty | Fill | Fill. |
| c | | | | Fill | Hold | Hold | Empty | Fill | Hold | Hold | Empty | Hold. |
| d | | | | | Fill | Hold | Hold | Empty | Hold | Empty | Fill | Hold. |
| e | | | | | | | Fill | Hold | Hold | Fill | Hold | Empty. |
| f | | | | | | | | | Fill | Hold | Hold | Hold. |
| g | | | | | | | | | | Fill | Hold | Hold. |
| h | | | | | | | | | | | | Fill. |

It will be seen that the apparatus herein shown provides for the continuous reception of milk and for the positive holding of the milk for determinate periods of time, and that the apparatus may be readily and thoroughly cleaned.

I claim as my invention:

1. A holding apparatus having, in combination, a tier of containers each having an outlet, a separate valve for each outlet, a series of devices each for opening one of said valves, a device for supplying liquid to the uppermost container, a vertical rotary shaft, a cam on said shaft arranged to operate the supplying device, and other cams on said shaft arranged to operate the valve-opening devices.

2. A holding apparatus having, in combination, a series of containers each having an outlet, a separate valve for each outlet, a series of plungers each for opening one of said valves, a rotary shaft, cams on said shaft, and levers pivoted at their free ends to said plungers and arranged to be swung by said cams.

3. A holding apparatus having, in combination, a tier of containers each having an outlet, each container but one successively discharging into an adjacent container, a separate valve for each outlet, a series of members each for opening one of said valves, a vertical rotary shaft, cams mounted on said shaft, and connections between the cams and said devices for actuating the latter.

4. A holding apparatus having, in combination, two tiers of containers, each container having an outlet arranged to discharge liquid to the next lower container, a separate valve for each outlet, a device arranged to distribute liquid to the uppermost containers of the two tiers alternately, and means for operating the distributing device and the valves in proper sequence.

5. A holding apparatus having, in combination, a casing, a plurality of pans, means within the casing for removably supporting said pans in a tier, each pan having an outlet in its bottom wall, a valve for each outlet, means for automatically operating each valve, and means for supplying liquid to the upper pan.

6. A holding apparatus having, in combination, a tier of containers each having an outlet arranged to discharge liquid to the next lower container, a separate valve for each outlet, means for supplying liquid to the uppermost container, and means for operating the supplying means and the valves in proper sequence.

In testimony whereof, I have hereunto set my hand.

CHAS. SKIDD.

Copies of this patent may be obtained for five cents each, by addressing the "Commissioner of Patents, Washington, D. C."